(12) United States Patent
Huang et al.

(10) Patent No.: US 12,050,638 B2
(45) Date of Patent: Jul. 30, 2024

(54) MULTIMEDIA PLAYING METHOD AND DEVICE

(71) Applicant: BEIJING BYTEDANCE NETWORK TECHNOLOGY CO., LTD., Beijing (CN)

(72) Inventors: Yipeng Huang, Beijing (CN); Chaopeng Liu, Beijing (CN); Yan Yu, Beijing (CN); Yiming Xiong, Beijing (CN); Xing He, Beijing (CN); Haolin Liu, Beijing (CN); Yuxin Yang, Beijing (CN); Song Feng, Beijing (CN); Liang Ren, Beijing (CN); Wei Zhang, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 92 days.

(21) Appl. No.: 17/601,288

(22) PCT Filed: Jul. 2, 2021

(86) PCT No.: PCT/CN2021/104363
§ 371 (c)(1),
(2) Date: Oct. 4, 2021

(87) PCT Pub. No.: WO2022/037283
PCT Pub. Date: Feb. 24, 2022

(65) Prior Publication Data
US 2022/0327154 A1   Oct. 13, 2022

(30) Foreign Application Priority Data
Aug. 17, 2020 (CN) .......................... 202010827479.1

(51) Int. Cl.
*G06F 3/048* (2013.01)
*G06F 3/04817* (2022.01)
(Continued)

(52) U.S. Cl.
CPC .......... *G06F 16/48* (2019.01); *G06F 3/04817* (2013.01); *G06F 3/0482* (2013.01)

(58) Field of Classification Search
None
See application file for complete search history.

(56) References Cited

U.S. PATENT DOCUMENTS

2006/0228149 A1   10/2006   Harley
2012/0117042 A1*  5/2012   Durante .............. G06F 16/4387
                                                  707/705
(Continued)

FOREIGN PATENT DOCUMENTS

CN   101500135 A   8/2009
CN   101673175 A   3/2010
(Continued)

OTHER PUBLICATIONS

International Patent Application No. PCT/CN2021/104363, International Search Report mailed Sep. 28, 2021, 11 pages.
(Continued)

*Primary Examiner* — Thanh T Vu

(57) ABSTRACT

Embodiments of the present disclosure provide a multimedia playing method and a device. The method includes: displaying a first interface; playing a segment of a first playing object on the first interface, where the first interface includes prompt information, and the prompt information is used to prompt that the segment of the first playing object is being played.

17 Claims, 10 Drawing Sheets

(51) Int. Cl.
*G06F 3/0482* (2013.01)
*G06F 16/48* (2019.01)

(56) References Cited

U.S. PATENT DOCUMENTS

| | | |
|---|---|---|
| 2015/0049036 A1 | 2/2015 | Kim et al. |
| 2015/0121220 A1 | 4/2015 | Lee et al. |
| 2017/0347993 A1 | 12/2017 | Anand |
| 2019/0268650 A1 | 8/2019 | Avedissian et al. |
| 2019/0340665 A1 | 11/2019 | Cohen |
| 2022/0070247 A1* | 3/2022 | Wang ................ G06F 3/165 |

FOREIGN PATENT DOCUMENTS

| | | |
|---|---|---|
| CN | 101802920 A | 8/2010 |
| CN | 102202039 A | 9/2011 |
| CN | 104301510 A | 1/2015 |
| CN | 105556605 A | 5/2016 |
| CN | 105893023 A | 8/2016 |
| CN | 106448713 A | 2/2017 |
| CN | 107464157 A | 12/2017 |
| CN | 108174248 A | 6/2018 |
| CN | 305312115 S | 8/2019 |
| CN | 305670459 S | 3/2020 |
| CN | 110968728 A | 4/2020 |
| CN | 111935357 A | 11/2020 |
| CN | 306359284 S | 3/2021 |
| CN | 113242444 A | 8/2021 |
| JP | 2003108153 A | 4/2003 |
| KR | 20140111175 A | 9/2014 |
| WO | 2020132818 A1 | 7/2020 |

OTHER PUBLICATIONS

Chinese Patent Application No. 202010827479.1, First Office Action mailed Jan. 27, 2021, 6 pages.
QQ Music Design Team (2019) "QQ music finally opened the VIP song audio-visual service" [online] website: http://www.uisdc.com/hunter/0221308126.html.
Chinese Patent Application No. 202010827479.1, Notice of Allowance mailed Jun. 21, 2021, 5 pages.
Extended EP Search Report issued Sep. 29, 2023 in EP Appl. No. 21857379.8 (9 pages).
Office Action issued Sep. 12, 2023 in IN Appl No. 202127042764, English translation (9 pages).

* cited by examiner

MULTIMEDIA PLAYING METHOD AND DEVICE

CROSS-REFERENCE TO RELATED APPLICATIONS

This application is a National Stage of International Application No. PCT/CN2021/104363, filed on Jul. 2, 2021, which claims priority to Chinese Patent Application No. 202010827479.1, filed on Aug. 17, 2020 and entitled "Multimedia Playing Method and Device". Both of the above applications are hereby incorporated by reference in their entireties.

TECHNICAL FIELD

Embodiments of the present disclosure relate to the technical field of multimedia processing, and in particular to a multimedia playing method, a device, an electronic device, a computer-readable storage medium, a computer program product and a computer program.

BACKGROUND

With the progress of technology, users who use multimedia playing applications (APPs) are increasing. The users using the multimedia playing APPs (e.g., audio playing APPs) are generally classified into premium users (i.e. members) and free users (i.e. non-members).

Taking a music scene as an example, at present, a free user can only listen to a segment of a song for certain songs or all songs (in an on-demand scene), therefore, a problem of the song being interrupted may happen in a process of playing the song using an audio playing APP by the free user. Since the free user cannot know a reason for the song interruption in the process of playing the song, a problem of a user misoperation may occur (e.g. the user restarts the audio playing APP), reducing a use experience of the user.

SUMMARY

Embodiments of the present disclosure provide a multimedia playing method, a device, an electronic device, a computer-readable storage medium, a computer program product and a computer program to solve the technical problem in the prior art that a misoperation occurs due to that a user cannot know the reason of song interruption.

In a first aspect, an embodiment of the present disclosure provides a multimedia playing method, including:
  displaying a first interface;
  playing a segment of a first playing object on the first interface, where the first interface includes prompt information, and the prompt information is used to prompt that the segment of the first playing object is being played.

In a second aspect, an embodiment of the present disclosure provides a multimedia playing device, including:
  a display module, configured to display a first interface;
  a processing module, configured to play a segment of a first playing object on the first interface, where the first interface includes prompt information, and the prompt information is used to prompt that the segment of the first playing object is being played.

In a third aspect, according to one or more embodiments of the present disclosure, an electronic device is provided, including: a processor and a memory; where the memory has computer-executing instructions stored thereon; and the processor executes the computer-executing instructions stored on the memory, so that the processor executes the multimedia playing method as described in the first aspect and various possible designs of the first aspect.

In a fourth aspect, according to one or more embodiments of the present disclosure, a computer-readable storage medium is provided, where the computer-readable storage medium has computer-executing instructions stored therein, and when a processor executes the computer-executing instructions, the multimedia playing method as described in the first aspect and various possible designs of the first aspect is implemented.

In a fifth aspect, according to one or more embodiments of the present disclosure, a computer program product is provided, including computer-executing instructions, and when a processor executes the computer-executing instructions, the multimedia playing method as described in the first aspect and various possible designs of the first aspect is implemented.

In a sixth aspect, according to one or more embodiments of the present disclosure, a computer program is provided, and when a processor executes the computer program, the multimedia playing method as described in the first aspect and various possible designs of the first aspect is implemented.

Using the multimedia playing method and device provided in the embodiments of the present disclosure, the first interface is displayed, and the segment of the first playing object is played on the first interface, where the first interface includes the prompt information used to prompt that the segment of the first playing object is being played, so as to prompt the user that he/she is in a preview state and can only listen to a segment of audio data, and that after a completion of playing the segment, the playing object will be interrupted, i.e. the audio data will be interrupted. In this way, the user knows the reason why the audio data is interrupted, thereby avoiding the problem of a misoperation occurring due to that the user cannot know the reason of audio data interruption, and improving a use experience of the user.

BRIEF DESCRIPTION OF THE DRAWINGS

In order to illustrate technical solutions in embodiments of the present disclosure or in the prior art more clearly, accompanying drawings which are required to be used in description of the embodiments or the prior art will be simply introduced. Apparently, the accompanying drawings in the following description are some embodiments of the present disclosure, and one of ordinary skill in the art can also obtain other accompanying drawings according to these drawings without paying creative efforts.

DESCRIPTION OF EMBODIMENTS

In order to make objects, technical solutions and advantages of embodiments of the present disclosure clearer, the technical solutions in the embodiments of the present disclosure will be clearly and comprehensively described in connection with the accompanying drawings in the embodiments of the present disclosure, and obviously, the described embodiments are part of the embodiments of the present disclosure, rather than all embodiments. Based on the embodiments in the present disclosure, all other embodiments obtained by one of ordinary skill in the art without making creative efforts are within the protection scope of the present disclosure.

Figure 1:
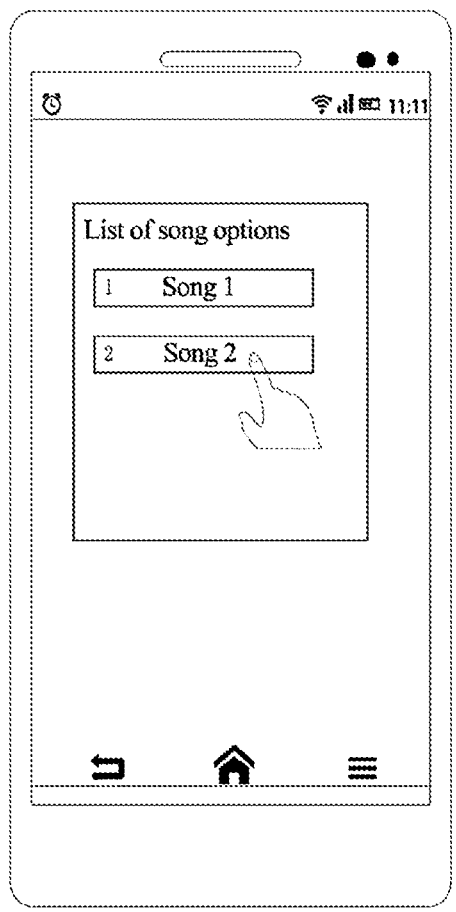
FIG. 1 is a schematic diagram of a list of song options provided by an embodiment of the present disclosure.

Taking a scene of music consuming as an example, a free user can select any song in a list of song options (illustrated in FIG. 1) when using an audio playing APP on an electronic device. For example, when the user selects song 2 and song 2 is a preview song, or when the user plays song 2 on-demand, it indicates that the user can only play a segment of song 2, i.e., can only listen to a preview portion of song 2, rather than completely play song 2. Therefore, the free user faces a problem that the song will be interrupted in a process of playing song 2. Since the free user cannot know a reason for the song interruption, a problem of a user misoperation may occur (e.g. the user restarts the audio playing APP), reducing a use experience of the user.

It can be appreciated that for some regions, when a user plays a song on-demand from a list in an audio playing APP, only preview of the song is supported due to requirements of a copyright party, but a complete playing is supported when playing a song of a list randomly.

In order to solve the above-described problems, according to an embodiment of the present disclosure, a preview player and a complete player can be provided, and when the user selects to play a preview song, the preview player is entered. A first interface is displayed based on the preview player, and the preview song is played on the first interface. The first interface includes prompt information, and the prompt information is used to prompt that a preview portion of the song is being currently played, so that the user knows that he/she can only play the preview portion of the preview song, and after the preview playing is completed, the preview song will be interrupted. In this way, the user knows the reason of the song interruption, and the problem of a misoperation occurring due to that the user cannot know the reason of the song interruption is avoided. Meanwhile, in order to improve a preview experience of the user, a refrain portion of the song, i.e. an essence portion, can be taken as the preview portion. In addition, a first key is also displayed on the first interface, so that the complete player can be entered quickly when the user triggers the first key, so as to play a song capable of being completely played, thereby realizing a fast switching of the preview song and a complete song, facilitating use of the user, and improving the use experience of the user.

An electronic device related to the present disclosure may be a wireless terminal or a wired terminal. A wireless terminal may refer to a device that provides connectivity of voice and/or other service data to a user, a handheld device having a wireless connection function, or other processing devices connected to a wireless modem. The wireless terminal can communicate with one or more core network devices via a radio access network (abbreviated as RAN). The wireless terminal may be a mobile terminal, such as a mobile phone (or referred to as a "cellular" phone), and a computer having a mobile terminal, for example, may be a portable, pocket-sized, handheld, computer-inbuilt or vehicle-mounted mobile apparatus, and they exchange language and/or data with a wireless access network. As another example, the wireless terminal may also be a device such as a personal communication service (abbreviated as PCS) phone, a cordless telephone, a session initiation protocol (abbreviated as SIP) phone, a wireless local loop (abbreviated as WLL) station, a personal digital assistant (abbreviated as PDA), etc. The wireless terminal may also be referred to as a system, a subscriber unit, a subscriber station, a mobile station, a mobile, a remote station, a remote terminal, an access terminal, a user terminal, a user agent, a user device (or User Equipment), which is not limited here. In an implementation, the above terminal device may also be a device such as a smart watch, a tablet computer, etc. The interface is displayed by running an audio playing App installed on the electronic device.

Figure 2:
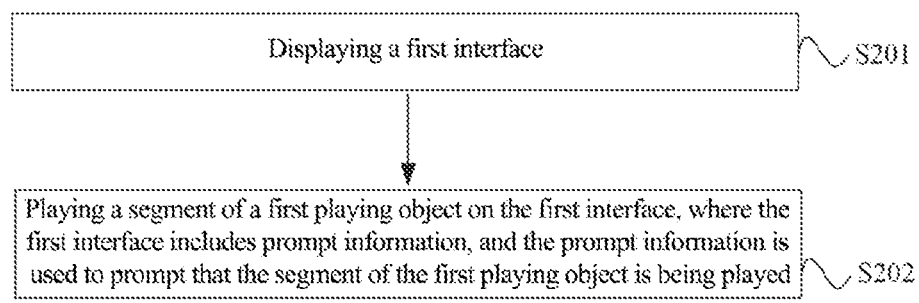
FIG. 2 is a first schematic flowchart of a multimedia playing method provided by an embodiment of the present disclosure.

Referring to FIG. 2, FIG. 2 is a first schematic flowchart of a multimedia playing method provided by an embodiment of the present disclosure. The multimedia playing method in the embodiment of the present disclosure can be applied to an electronic device having a display interface, and the multimedia playing method includes:

S201, displaying a first interface.

S202, playing a segment of a first playing object on the first interface, where the first interface includes prompt information, and the prompt information is used to prompt that the segment of the first playing object is being played.

In the disclosed embodiment, the first playing object is a multimedia object, which includes, but is not limited to, at least one of audio data and video data, where the audio data may be a song, a speech audio and so on, and the video data may be a movie, a course video and so on. For convenience of description, the following embodiments are described by taking audio data as an example of the first playing object.

In the embodiment of the present disclosure, when a user uses an electronic device to play a preview portion of audio data, i.e. a segment of the first playing object, the user plays the segment of the first playing object on the first interface provided by the electronic device. The first interface includes the prompt information, and the prompt information prompts that the segment of the first playing object is being played, so that the user knows that he/she is in a preview state, and that the electrical device can only play the segment of the first playing object, and will stop playing the first playing object after a completion of playing the segment, i.e. the preview portion, that is, a playing interruption of the audio data occurs.

In an implementation, the prompt information includes prompting information on a prompt text area on the first interface and/or prompt information on a second key in the first interface.

In an implementation, the prompt information may be 30 seconds preview, or may be other text, which can be set according to an actual requirement, as long as that the preview portion of the audio data is being played can be prompted. No limitation is imposed here.

Figure 3:
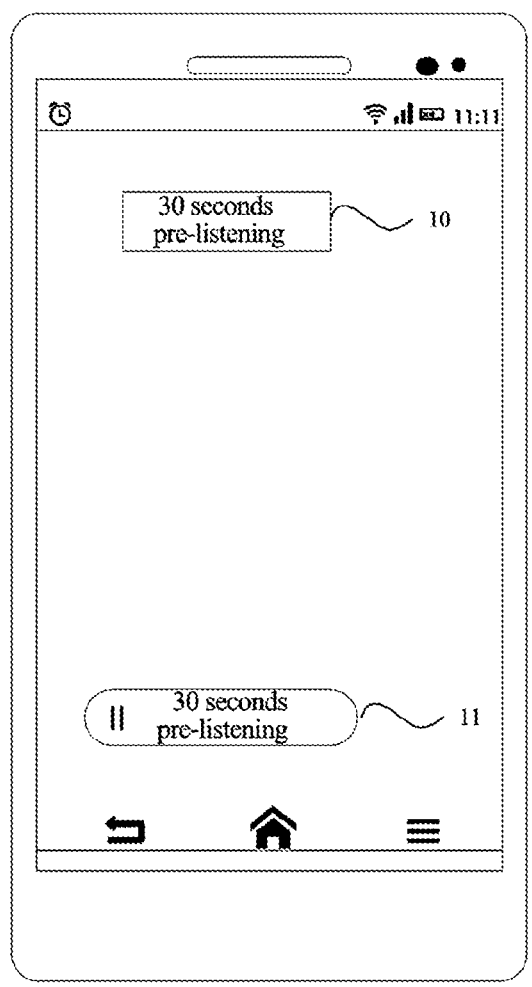
FIG. 3 is a first displaying schematic diagram of a first interface provided by an embodiment of the present disclosure.

A function of the second key is to control a playing of the first playing object or a pausing of playing of the first playing object. In order to facilitate the user to control the first playing object, and in order to better prompt the user, the prompt information is displayed on both the prompt text area and the second key. For example, as shown in FIG. 3, the first interface includes a prompt text area 10 and a second key 11. The prompt information is displayed on both the prompt text area 10 and the second key 11, i.e. to display "30 seconds preview" to inform the user that he/she is in a state of 30 seconds preview, i.e. only can play 30 seconds. Certainly, positions of the prompt text area and the second key shown in FIG. 3 are merely an example; positions where the prompt text area and second key are located on the first interface can be determined according to an actual requirement, and the present disclosure is not limited thereto.

In an implementation, the first interface further includes one or more of a collecting key, a comment key, a sharing key, a like key, and a subtitle display area.

Specifically, the user can quickly collect the first playing object through the collecting key, to realize a quick collection of the playing object. The user can also comment on the first playing object through the comment key, quickly realize the forwarding and sharing of the first playing object through the sharing key, and like the first playing object through the like key. The subtitle display area displays a subtitle of the first playing object being currently played, for example, when the first playing object is a song, the subtitle is lyrics of the first playing object being currently played.

Figure 4:
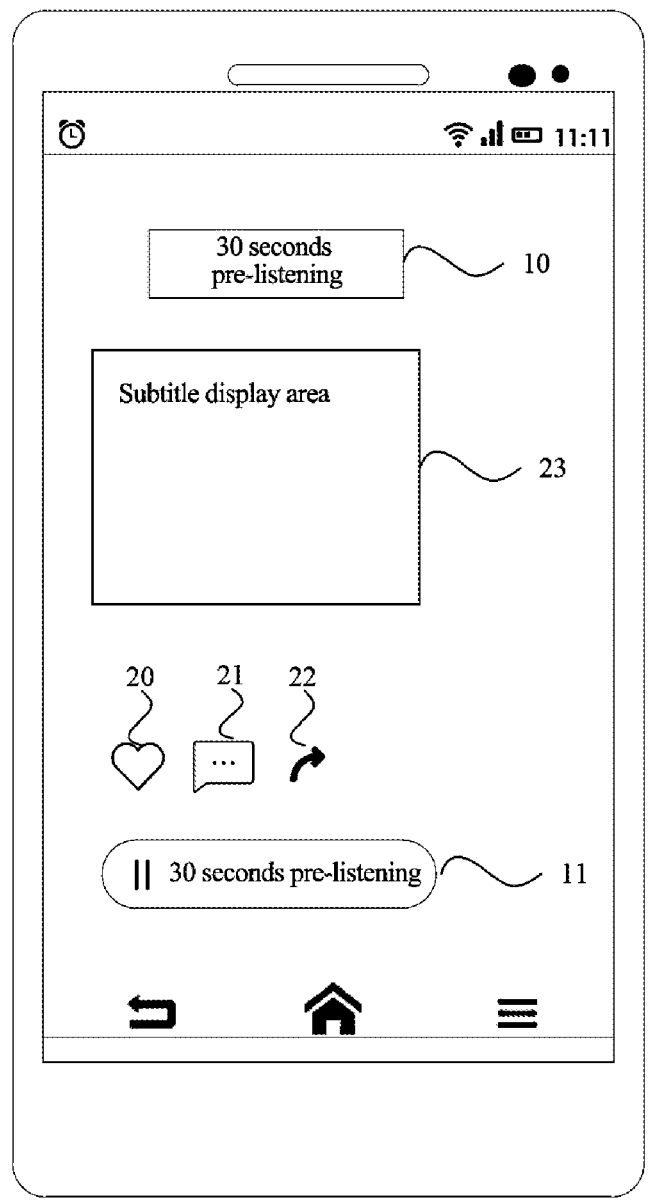
FIG. 4 is a second displaying schematic diagram of a first interface provided by an embodiment of the present disclosure.

For example, referring to FIG. 4, the first interface includes a collecting key 20, a comment key 21, a sharing key 22, and a subtitle display area 23. Certainly, the positions where the collecting key 20, the comment key 21, the sharing key 22 and the subtitle display area 23 are located on the first interface shown in FIG. 4 are merely an example, and can be set by a developer according to an actual situation, and the present disclosure is not limited thereto.

In addition, in an implementation, the first interface further includes information such as a name of the first playing object, a name of a singer or a lecturer corresponding to the first playing object, and/or a name of a next first playing object. Furthermore, a picture relevant to the first playing object (e.g., a picture of the singer) may further be set as a background of the first interface to increase the user's knowledge of the first playing object and improve a visual experience of the user.

In the embodiment of the present disclosure, since there is the prompt information on the first interface, in a process of the user playing the segment of the first playing object, i.e. the preview portion, the user can be prompted at any moment that he/she is in the preview state, and that when the playing of the preview portion is completed, a remaining portion of the first playing object cannot be played, and the problem of an interruption of the playing object would occur. In this way, it can be avoided that the user generates a doubt of why the interruption of the playing object occurs.

It can be appreciated that the user using the electronic device to play the audio data is actually using an audio playing App on the electronic device, and the first interface is displayed by the audio playing App.

As can be seen from the above description, the first interface is displayed, and a segment of the first playing object is played on the first interface, where the first interface includes the prompt information used to prompt that the segment of the first playing object is being played, so as to prompt the user that he/she is in the preview state and can only listen to a segment of the audio data, and that after a completion of playing the segment, the playing object will be interrupted, i.e. the audio data will be interrupted. In this way, the user knows the reason why the audio data is interrupted, thereby avoiding the problem of a misoperation occurring due to that the user cannot know the reason of the audio data interruption, and improving the use experience of the user.

Figure 5:
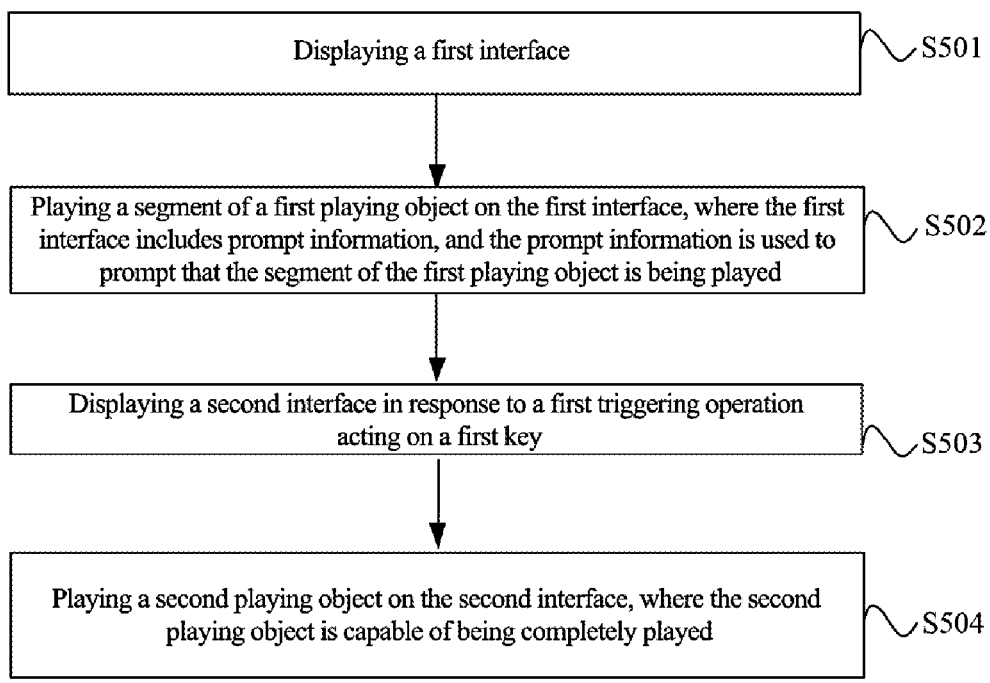
FIG. 5 is a second schematic flowchart of a multimedia playing method provided by an embodiment of the present disclosure.

Referring to FIG. 5, FIG. 5 is a second schematic flowchart of a multimedia playing method provided by an embodiment of the present disclosure. On a basis of the above-described embodiments, the first interface further includes a first key, and when the user performs a first triggering operation on the first key, the electronic device switches to a playing of a second playing object in response to the first triggering operation. This instance mainly describes how to switch to the playing of the second playing object, and a detailed description is as follows:

S501, displaying a first interface.

In the embodiment of the present disclosure, when the user utilizes the electronic device to play a preview portion of audio data, the user may select a first playing object to be played through a first playing object list, or may determine a next first playing object by operating on the first interface currently displayed in the electronic device, and then take the next first playing object as the first playing object to be played.

In an implementation, a third interface is provided by the electronic device, and the third interface includes a first playing object list which includes a plurality of first playing objects. A process of utilizing the first playing object list to determine the first playing object is as follows: displaying the first interface in response to a fourth triggering operation acting on any one of the first playing objects in the first playing object list.

In an implementation, the fourth triggering operation is a clicking operation.

Figure 6:
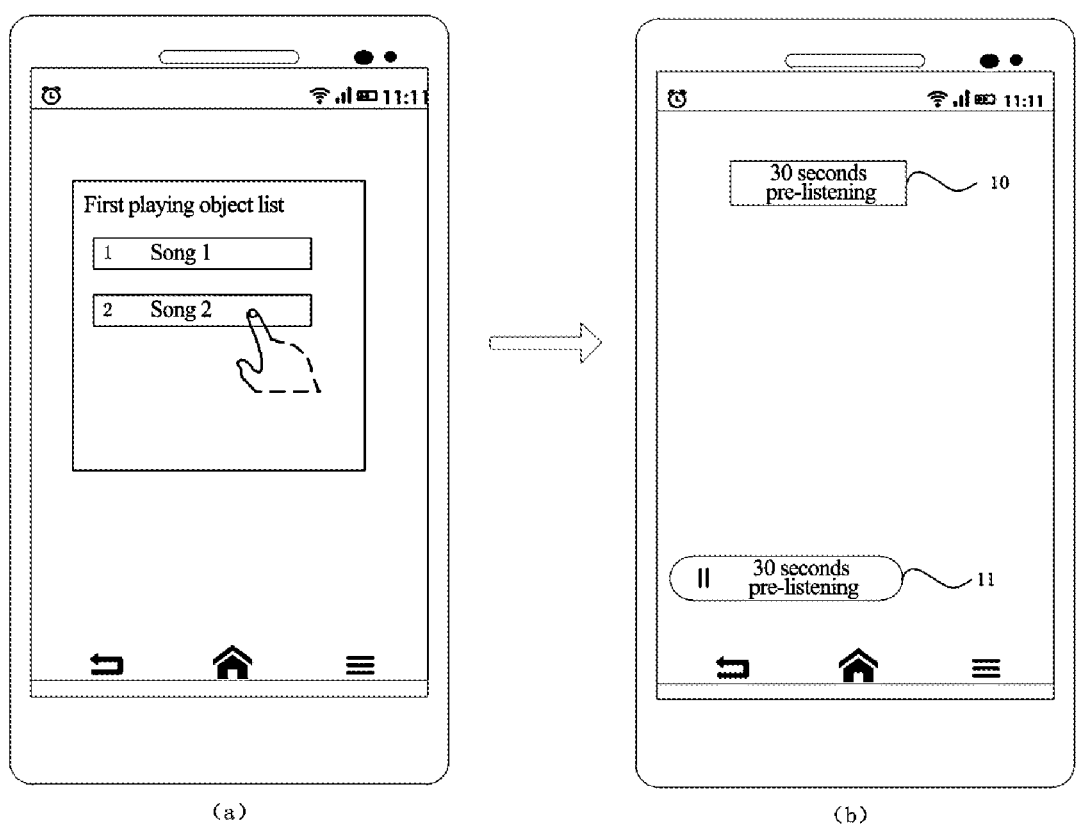
FIG. 6 is a schematic diagram of selecting a first playing object provided by an embodiment of the present disclosure.

Specifically, when the user wants to play certain audio data, the third interface (as shown in (a) of FIG. 6) is opened, and the third interface includes a first playing object list. Then by clicking on one first playing object option in the first playing object list (for example, each first playing object is a song, and the user selects the second first playing object, i.e., selecting song 2, then song 2 is directly determined as the first playing object to be played), a preview player is started, i.e. invoked, and the first interface is displayed based on the preview player (as shown in (b) of FIG. 6) to play song 2 on the first interface.

The first playing object list may be a list that includes only preview audio (i.e., the first playing objects), and may also be a mix list that includes both the first playing objects and second playing objects.

Further, for ease of controlling the playing of audio data, the first playing object list may be a list that includes only the first playing objects. After entering the first interface, the preview player can directly determine the next first playing object from the first playing object list in response to a specific triggering operation acting on the first playing interface, e.g., an up-sliding operation or a down-sliding operation, to realize a quick switching of the first playing object, i.e. to realize a quick switching of the preview audio.

In an implementation, a process of determining the first playing object to be played according to the first interface currently displayed is as follows:

switching a segment of the first playing object currently played on the first interface to a segment of the next first playing object in response to a fifth triggering operation acting on the first interface.

Specifically, when the user performs the fifth triggering operation on the first interface, it indicates a requirement of switching the first playing object, i.e., switching the segment of the first playing object currently played to the segment of the next first playing object, then the next first playing object is taken as the first playing object to be played, so as to play the next first playing object on the first interface, realizing the quick switching of the first playing object, i.e. realizing the quick switching of the preview audio.

The fifth triggering operation is an up-sliding operation or a down-sliding operation.

In the embodiment of the present disclosure, the switching of the first playing object is performed only when the user performs the fifth triggering operation on the current first interface, i.e. the user is required to perform switching manually, thereby avoiding a problem of switching the first playing object mistakenly due to automatic switching when the playing is completed. For example, after the playing of the preview portion of the first playing object currently played on the first interface is completed, the user wants to re-play the preview portion, but a switching to the next first playing object has occurred because of automatic switching, resulting in that the user cannot directly re-play the preview portion corresponding to the current first playing object.

In addition, in any one of the disclosed embodiments, in an implementation, the user performs a sixth triggering operation on the prompt information, and the electronic device jumps to and displays a fourth interface in response to the sixth triggering operation acting on the prompt information, where the fourth interface includes a member introduction area and/or a membership-opening prompt key. Member introduction information is included in the member introduction area, and the user can know member rights through the member introduction information. And the user can further open a membership by operating on the membership-opening prompt key to become a premium user, i.e., become a member.

In an implementation, the sixth triggering operation may be a clicking operation.

Figure 7:
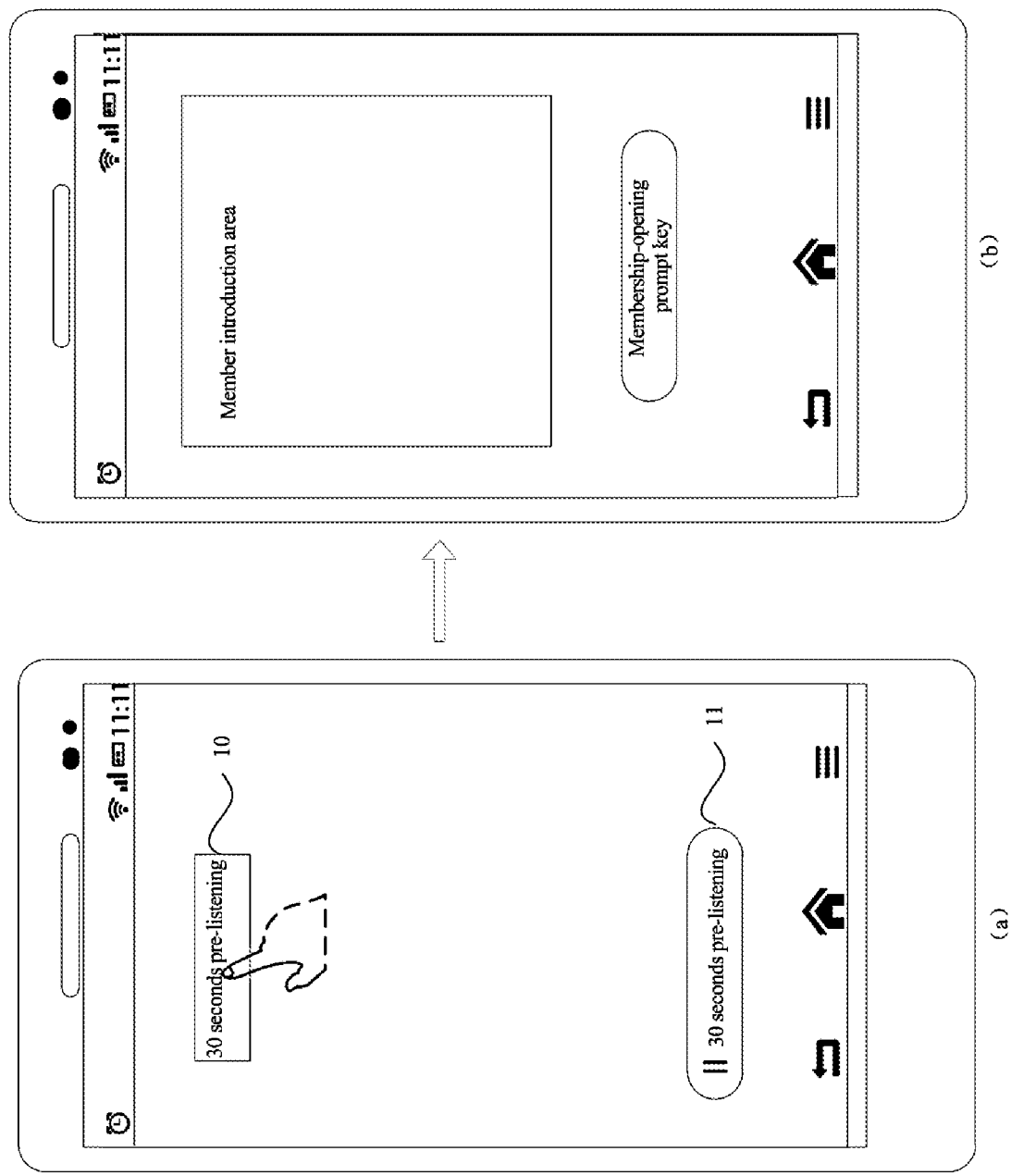
FIG. 7 is a displaying schematic diagram of a fourth interface provided by an embodiment of the present disclosure.

For example, referring to (a) of FIG. 7, when the user wants to know the member rights or wants to open a membership, the user clicks on prompt information in a prompt text area 10 on the first interface, and the electronic device jumps to the fourth interface (as shown in (b) of FIG. 7) that includes a member introduction area and a membership-opening prompt key. When the user clicks on the membership-opening prompt key, then a membership can be opened to become a premium user.

S502, playing a segment of a first playing object on the first interface, where the first interface includes prompt information, and the prompt information is used to prompt that the segment of the first playing object is being played.

In the embodiment of the present disclosure, from a playing object expression direction, in general, an essence portion of a playing object can most reflect a characteristic of the playing object (e.g., a theme to be expressed by the playing object); and from a user angle, the user can quickly determine whether he/she likes a certain playing object by playing an essence portion of the playing object. Therefore, the segment of the first playing object, i.e. the preview portion, may be the essence portion of the first playing object.

When the first playing object is a song, a refrain portion of the song is typically a climax portion of the song, i.e. the essence portion, which most reflects the characteristic of the song, therefore the essence portion of the first playing object may be the refrain portion of the first playing object, so that the user can listen to the refrain portion of the song, i.e., the essence portion, when playing the preview portion, thereby improving the preview experience of the user.

In addition, in an implementation, the first interface further includes a progress bar corresponding to the first playing object, and a position where the segment is located in the first playing object and a time progress of playing are displayed on the progress bar. That is, the position corresponding to the preview portion is marked on the progress bar, so that the user knows the position where the preview portion corresponding to the first playing object is located in the first playing object; and the time progress of playing, i.e. a playing progress value, is displayed on the progress bar, so that the user can know the playing progress of the segment of the first playing object in real time, thereby improving the use experience of the user.

Figure 8:
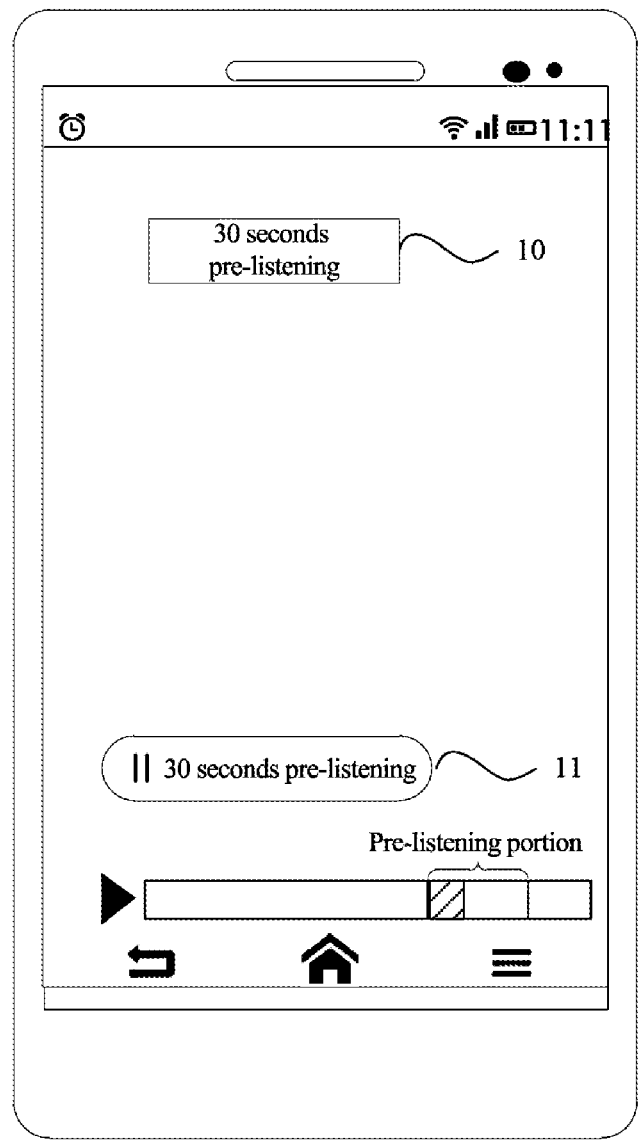
FIG. 8 is a displaying schematic diagram of a progress bar provided by an embodiment of the present disclosure.

For example, as shown in FIG. 8, the first interface includes a progress bar corresponding to the first playing object, and the position corresponding to the segment of the first playing object is marked on the progress bar, that is, the position matched with the preview portion is displayed; and the playing progress of the segment, i.e., the time progress of playing, is displayed on the progress bar corresponding to the first playing object. Certainly, a shape of the progress bar, a manner of displaying the preview portion and the time progress of playing shown in FIG. 8 is merely an example, and can be set by the developer according to an actual requirement, and the present disclosure is not limited thereto.

In the embodiment of the present disclosure, the preview portion is determined according to the refrain portion of the first playing object, i.e., the refrain portion of a certain duration is taken as the preview portion, so that the user can listen to the refrain portion, that is, listen to the climax portion of the song, when playing the preview portion corresponding to the first playing object, thereby improving the preview experience of the user.

S503, displaying a second interface in response to a first triggering operation acting on a first key.

S504, playing a second playing object on the second interface, where the second playing object is capable of being completely played.

In the embodiment of the present disclosure, when the user wants to play a second playing object capable of being completely played, the user can trigger the first key on the first interface, i.e. performing the first triggering operation on the first key, and the electronic device determines the second playing object which is randomly played in response to the first triggering operation acting on the first key, and displays the second interface to play the second playing object on the second interface.

In an implementation, the first triggering operation is a clicking operation.

In the embodiment of the present disclosure, in an implementation, the first interface and the second interface may be interfaces of one player, and certainly the first interface and the second interface may also be interfaces of different players. That is, the first interface may be a display interface of a first player, and the second interface may be a display interface of a second player.

Specifically, the first player may be a preview player, which is configured to play the segment of the first playing object (i.e. the preview portion of the audio data), and the second player is a complete player, which is configured to play the second playing object, i.e., may be configured to play complete audio data. When the user clicks on the first key, the electronic device closes the preview player and enters the complete player, selects a second playing object randomly based on the complete player, and displays the second interface, i.e., switching from the first interface to the second interface and playing the second playing object so that the user can play the complete playing audio data, thereby realizing the fast switching and playing of the complete audio data.

In an implementation, when selecting the second playing object, a selection from a second playing object list can be performed. The second playing object list may be a list that includes only second playing objects, or may be a mix list which not only includes the first playing objects (i.e., the preview audio data) but also includes the second playing objects (the audio data capable of being completely played).

Further, for ease of controlling the playing of the second playing object, the second playing object list may be a list that includes only the second playing objects. After entering the second interface, the complete player can directly determine the next second playing object from the second playing object list in response to a triggering operation acting on the second playing interface, e.g., an up-sliding operation or a down-sliding operation, to realize a quick switching of the second playing object.

It should be noted that the above-described first interface and second interface may be the same interface or may be different interfaces. When the first interface and the second interface are interfaces of different players, they are different interfaces, and when the first interface and the second interface are interfaces of the same player, they may be different interfaces, and may also be the same interface. Similarly, the first playing object list and the second playing object list may be the same list, or may be different lists. When the first playing object list and the second playing object list are lists provided by different players, they are different lists, and when the first playing object list and the second playing object list are lists provided by the same player, they may be different lists, and may also be the same list.

In addition, in an implementation, the developer may set content included in the second interface according to an actual requirement. For example, the second interface further includes one or more of a download key, a collecting key, a comment key, a sharing key, a like key, a subtitle display area, a name of the second playing object, a name of a singer or a lecturer corresponding to the second playing object, and a name of the next second playing object.

It should be noted that the user of the above-described embodiment is a free user (i.e. is a non-member) or a premium user (a member). When the user is a free user, he/she only has a preview right for part or all of playing objects provided by the electronic device, i.e., can only play segments of the playing objects. Utilizing the solution of the present disclosure, an audio-visual experience of a free user can be improved, and thus a possibility that he/she converts to a premium user is improved.

In the embodiment of the present disclosure, in the process of playing the segment of the first playing object, if the user wants to play the second playing object capable of being completely played, i.e., the audio data, the user can trigger the first key, and the electronic device directly switches to the second interface, and plays the second playing object on the second interface, thereby realizing the quick switching from the first playing object to the second playing object, i.e. realizing a quick switching from the preview playing to the complete playing.

Figure 9:
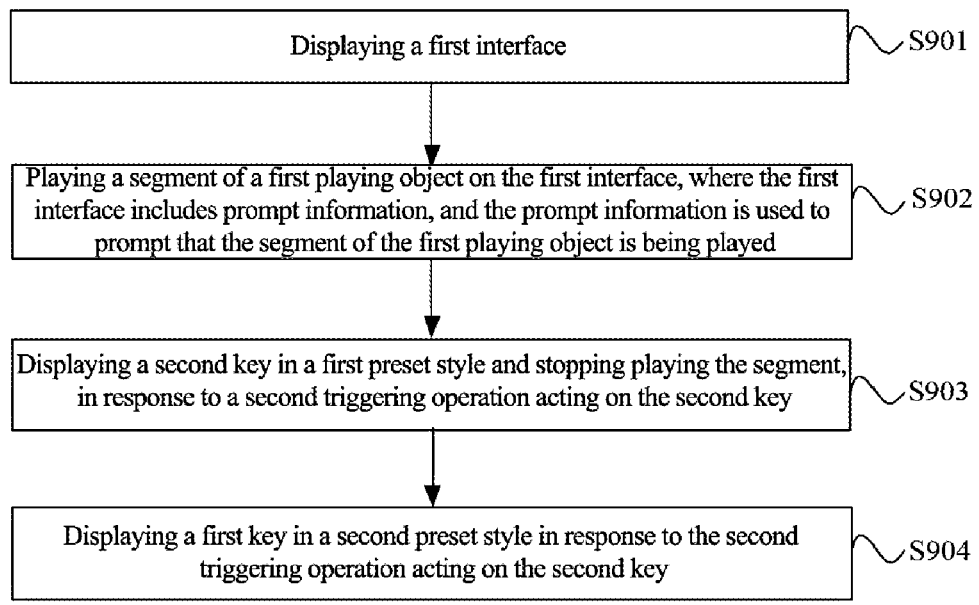
FIG. 9 is a third schematic flowchart of a multimedia playing method provided by an embodiment of the present disclosure.

Referring to FIG. 9, FIG. 9 is a third schematic flowchart of a multimedia playing method provided by an embodiment of the present disclosure. On a basis of the above embodiments, this instance mainly describes how to simultaneously control the first key and the second key to change in response to a triggering operation acting on the second key by the user, and a detailed description is as follows:

S901, displaying a first interface.

S902, playing a segment of a first playing object on the first interface, where the first interface includes prompt information, and the prompt information is used to prompt that a segment of the first playing object is being played.

S903, displaying a second key in a first preset style and stopping playing the segment, in response to a second triggering operation acting on the second key.

In the embodiment of the present disclosure, when the user wants to pause the playing of the segment of the first playing object, the user performs the second triggering operation on the second key in a playing state on the first interface. When the second triggering operation is detected, the electronic device controls the second key to switch to a pause state and stops playing the segment in response to the second triggering operation, and simultaneously displays the second key according to the first preset style, so that the user can know that the second key is in the pause state.

The first preset style includes one or more of a shrinking display of the second key, displaying the second key in gray scale, and displaying a preset pause prompt icon on the second key. The shrinking display of the second key represents shrinking an area occupied by the second key to a first size. The displaying the second key in gray scale represents displaying the second key in a first color, and the first color is a darker color, e.g., gray.

S904, displaying a first key in a second preset style in response to the second triggering operation acting on the second key.

In this embodiment, the user can quickly play a second playing object capable of being completely played by operating on the first key. When the electronic device detects the second triggering operation, it indicates that the user wants to pause the playing of the preview portion of the first playing object. At this time, the user may want to play the second playing object completely, then the first key is displayed according to the second preset style in response to the second triggering operation, so as to outstandingly display the first key.

The second preset style includes one or more of an amplifying display of the first key, highlighting the first key, displaying a preset random playing prompt text on the first key, and displaying a preset random playing prompt icon on the first key. The amplifying display represents amplifying the first key to a second size. The highlighting the first key represents highlighting the first key in a second color, and the second color is a brighter color, e.g., red.

In an implementation, the second triggering operation is a clicking operation.

Figure 10:
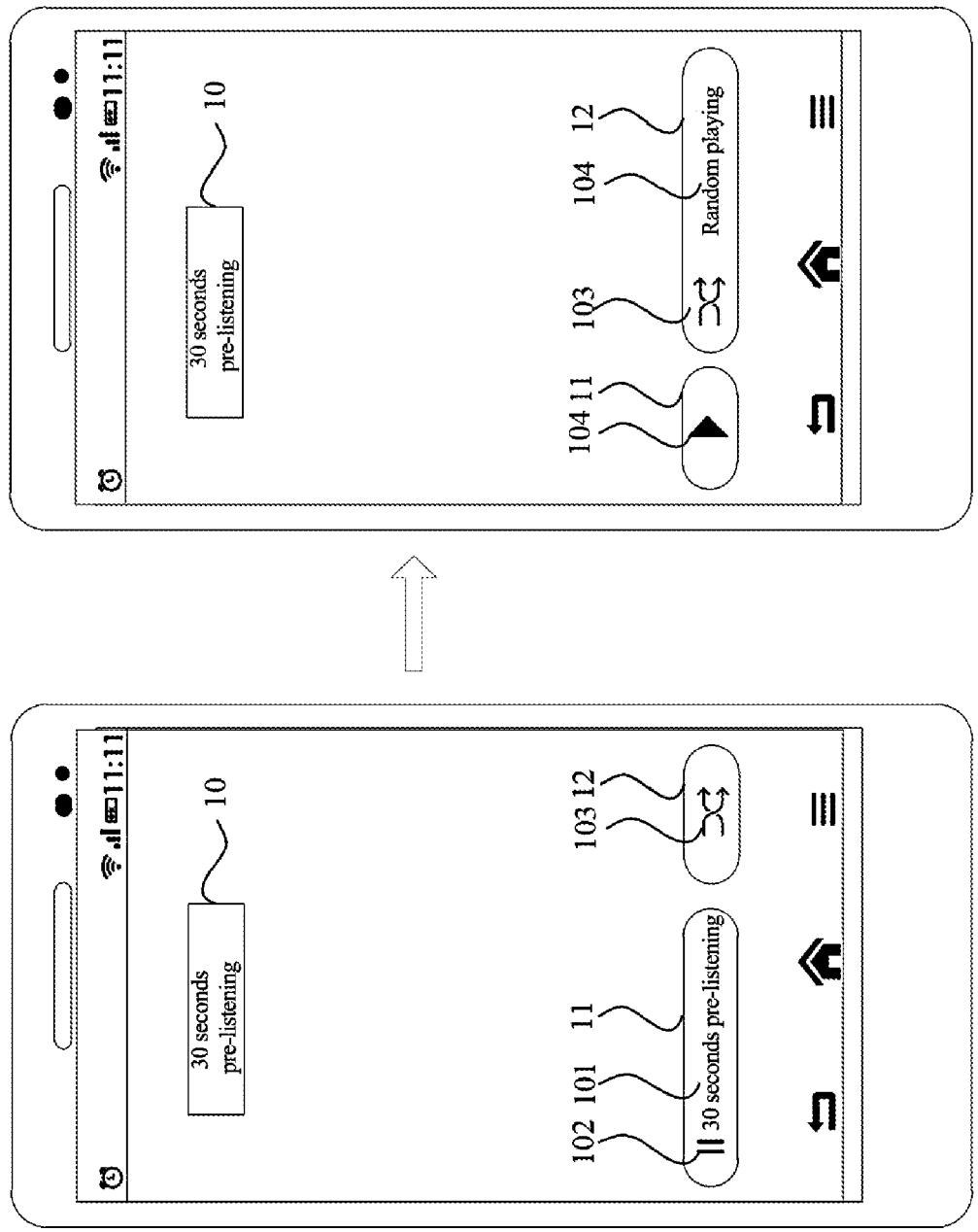
FIG. 10 is a schematic diagram of changes of a first key and a second key provided by an embodiment of the present disclosure.

Taking a specific application scenario as an example, as shown in (a) of FIG. 10, a second key 11 in the first interface is in a playing state, i.e., the segment of the first playing object is being played at the moment, where a display style of the second key 11 in the playing state is an amplifying display, displaying prompt information 101 (i.e. 30 seconds preview) on the second key, and displaying a preset playing icon 102 on the second key. At the same time, a display style of a first key 12 is a shrinking display, displaying in gray scale, and displaying a preset random playing prompt icon 103 on the first key. When the user clicks on the second key in the playing state, i.e. when the user performs the second triggering operation on the second key, it indicates that the segment is required to be stopped, and as shown in (b) of FIG. 10, the electronic device controls the second key 11 to perform a shrinking display and displays a preset pause icon 104 on the second key in response to the second triggering operation, and controls the first key 12 to perform an amplifying display, a highlighting, and displays a preset random playing prompt text 104 (i.e. "random playing") on the first key.

In an implementation, in a case that the second key is in the pause state, i.e. the segment of the first playing object is in the pause state, when the user wants to continue to play or re-play the segment, the user can continue to operate on the second key in the pause state, i.e. to perform a third triggering operation on the second key displayed in the first preset style, and the electronic device controls the second key in the pause state to switch to the playing state in response to the third triggering operation acting on the second key displayed in the first preset style, displays the second key in a third preset style, and continues to play or re-plays the segment, thereby realizing a control of the playing state of the first playing object, and realizing outstanding displaying of the second key, which facilitates the user to know that the second key is in the playing state.

The third triggering operation may be a clicking operation. The third preset style includes one or more of an amplifying display of the second key, highlighting the second key, displaying prompt information on the second key, and displaying a preset playing icon on the second key.

In an implementation, when the electronic device detects the third triggering operation, it indicates that the user wants to continue to play or re-play the segment of the first playing object, at the moment, the user may not want to play the second playing object, then in response to the third triggering operation acting on the second key displayed in the first preset style, the first key is displayed in a fourth preset style, i.e. not highlighting the first key.

The fourth preset style includes one or more of a shrinking display of the first key, displaying the first key in gray scale, and displaying a preset random playing prompt icon on the first key.

Continuing the above-described application scenario, after the user performs the second triggering operation on the second key, i.e. the second key and the segment of the first playing object are both in the pause state, if the user wants to continue to play or re-play the segment, the user continues to click on the second key, i.e. performs the third triggering operation on the second key, and the electronic device switches the second key to the playing state in response to the third triggering operation, and controls styles of the second key and the first key to change. The style of the second key before the change is a style of the second key 11 as shown in (b) of FIG. 10, and the style of the second key after the change is a style of the second key 11 as shown in (a) of FIG. 10. At the same time, the style of the first key before the change is a style of the first key 12 as shown in (b) of FIG. 10, and the style of the first key after the change is a style of the first key 12 as shown in (a) of FIG. 10.

In the embodiments of the present disclosure, since a display area of the first interface is limited, in order to save space and to improve use satisfaction of the user, the second key and the first key are arranged side by side, and the operation which the user wants to perform is determined according to the triggering operation on the second key by the user, so as to determine whether to outstandingly display the second key or the first key. For example, when the user performs the second triggering operation on the second key in the playing state, it indicates that the user may not want to listen to the segment of the first playing object, i.e. the preview audio data, but wants to play the second playing object capable of being played completely, then the second key is no longer displayed outstandingly, and the first key is displayed outstandingly.

Figure 11:
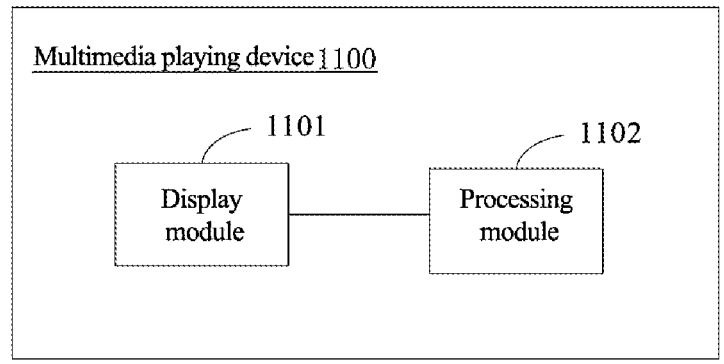
FIG. 11 is a structural block diagram of a multimedia playing device provided by an embodiment of the present disclosure.

Referring to FIG. 11, FIG. 11 is a structural block diagram of a multimedia playing device provided by an embodiment of the present disclosure. For ease of illustration, only portions related to embodiments of the present disclosure are shown. Referring to FIG. 11, the multimedia playing device 1100 includes: a display module 1101 and a processing module 1102.

The display module 1101 is configured to display a first interface.

The processing module 1102 is configured to play a segment of a first playing object on the first interface, where the first interface includes prompt information, and the prompt information is used to prompt that a segment of the first playing object is being played.

In an embodiment of the present disclosure, the first interface further includes a first key, and the processing module 1102 is further configured to:
  display a second interface in response to a first triggering operation acting on the first key;
  playing a second playing object on the second interface, where the second playing object is capable of being completely played.

In an embodiment of the present disclosure, the segment of the first playing object is an essence portion of the first playing object.

In an embodiment of the present disclosure, the essence portion of the first playing object is a refrain portion of the first playing object.

In an embodiment of the present disclosure, the first interface further includes a progress bar corresponding to the first playing object, and a position where the segment is located in the first playing object and a time progress of playing are displayed on the progress bar.

In an embodiment of the present disclosure, the first interface and the second interface are interfaces of different players.

In an embodiment of the present disclosure, the first interface further includes a second key, and the processing module 1102 is further configured to:
  display the second key in a first preset style and stop playing the segment, in response to a second triggering operation acting on the second key.

In an embodiment of the present disclosure, the processing module 1102 is further configured to:
  display the first key in a second preset style in response to the second triggering operation acting on the second key.

In an embodiment of the present disclosure, the processing module 1102 is further configured to:

display the second key in a third preset style in response to a third triggering operation acting on the second key displayed in the first preset style, and continue to play or re-play the segment.

In an embodiment of the present disclosure, the processing module 1102 is further configured to:

display the first key in a fourth preset style in response to the third triggering operation acting on the second key displayed in the first preset style.

In an embodiment of the present disclosure, a third interface is provided by an electronic device, where the third interface includes a first playing object list, and the display module 1101 is further configured to:

display the first interface in response to a fourth triggering operation acting on any one of first playing objects in the first playing object list.

In an embodiment of the present disclosure, the processing module 1102 is further configured to:

switch the segment of the first playing object currently played on the first interface to a segment of a next first playing object in response to a fifth triggering operation acting on the first interface.

In an embodiment of the present disclosure, the processing module 1102 is further configured to:

display a fourth interface in response to a sixth triggering operation acting on the prompt information, where the fourth interface includes a member introduction area and/or a membership-opening prompt key.

In an embodiment of the present disclosure, where the first preset style includes one or more of a shrinking display of the second key, displaying the second key in gray scale, and displaying a preset pause prompt icon on the second key.

In an embodiment of the present disclosure, where the second preset style includes one or more of an amplifying display of the first key, highlighting the first key, displaying a preset random playing prompt text on the first key, and displaying a preset random playing prompt icon on the first key.

In an embodiment of the present disclosure, the first interface further includes one or more of a collecting key, a comment key, a sharing key, a like key, and a subtitle display area.

In order to implement the embodiments described above, an embodiment of the present disclosure further provides an electronic device.

Figure 12:
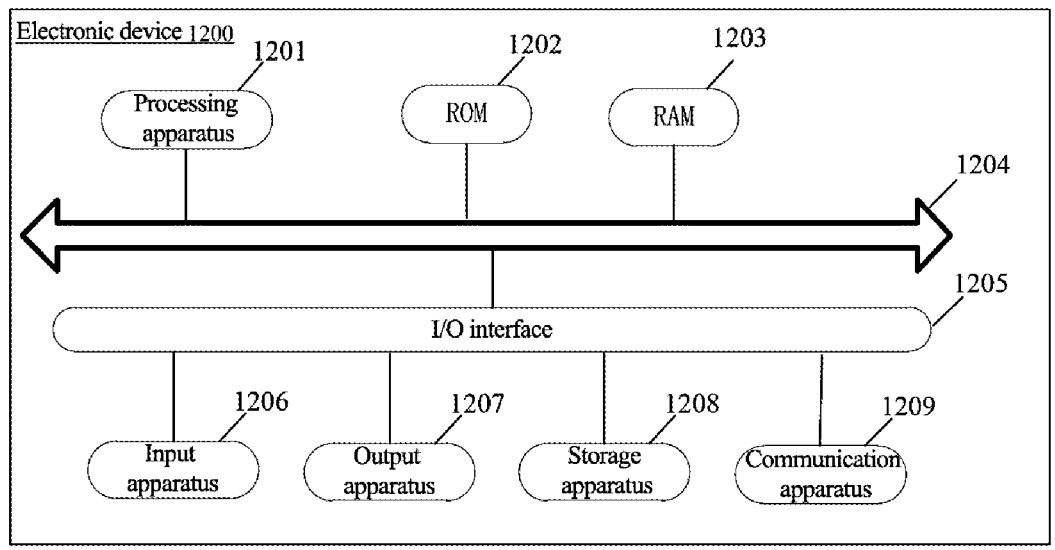
FIG. 12 is a schematic structural diagram of an electronic device provided by an embodiment of the present disclosure.

Referring to FIG. 12, which shows a schematic structural diagram of an electronic device 1200 that is suitable for implementing embodiments of the present disclosure, and the electronic device 1200 may be a terminal device or a server. The terminal device may include, but is not limited to, a mobile terminal such as a mobile phone, a notebook computer, a digital broadcast receiver, a personal digital assistant (abbreviated as PDA), a portable Android device (abbreviated as PAD), a portable media player (abbreviated as PMP), a vehicle terminal (e.g. a vehicle navigation terminal) and the like, and a fixed terminal such as a digital TV, a desktop computer and the like. The electronic device shown in FIG. 12 is merely an example and should not bring any limitation to functionality and use scope of the embodiments of the present disclosure.

As shown in FIG. 12, the electronic device 1200 may include a processing apparatus (e.g. a central processor, a graphic processor, etc.) 1201 that can execute various appropriate actions and processing according to a program stored in a read only memory (abbreviated as ROM) 1202 or a program loaded into a random access memory (abbreviated as RAM) 1203 from a storage apparatus 1208. In the RAM 1203, various programs and data required by the electronic device 1200 to operate are also stored. The processing apparatus 1201, the ROM 1202, and the RAM 1203 are connected to each other via a bus 1204. An input/output (I/O) interface 1205 is also connected to the bus 1204.

In general, the following apparatuses may be connected to the I/O interface 1205: an input apparatus 1206 including, for example, a touch screen, a touchpad, a keyboard, a mouse, a camera, a microphone, an accelerometer, a gyroscope, etc.; an output apparatus 1207 including, for example, a liquid crystal display (abbreviated as LCD), a speaker, a vibrator, etc.; a storage apparatus 1208 including, for example, a magnetic tape, a hard disk, etc.; and a communication apparatus 1209. The communication apparatus 1209 can allow the electronic device 1200 to communicate wirelessly or in a wired manner with other devices to exchange data. Although FIG. 12 illustrates the electronic device 1200 with various apparatuses, it should be understood that not all illustrated apparatuses are required to be implemented or provided. More or fewer apparatuses may be implemented or provided alternatively.

In particular, according to embodiments of the present disclosure, the processes described above with reference to flowcharts can be implemented as a computer software program. For example, an embodiment of the present disclosure includes a computer program product, which includes a computer program carried on a computer-readable medium, and the computer-readable medium includes program code used to execute the methods shown in the flowcharts. In such embodiments, the computer program can be downloaded and installed from a network through the communication apparatus 1209, or installed from the storage apparatus 1208, or installed from the ROM 1202. When the computer program is executed by the processing apparatus 1201, the above-described functions defined in the methods of the embodiments of the present disclosure are executed. An embodiment of the present disclosure further includes a computer program, and when the computer program is run on an electronic device, the above-described functions defined in the methods of the embodiments of the present disclosure are executed.

It should be noted that the above-described computer-readable medium of the present disclosure may be a computer-readable signal medium or a computer-readable storage medium or any combination of the two described above. The computer-readable storage medium may be, for example, but is not limited to, an electronic, magnetic, optical, electromagnetic, infrared, or semiconductor system, apparatus, or device, or any combination thereof. More specific examples of the computer-readable storage medium may include but are not limited to: an electrical connection having one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing. In the present disclosure, the computer-readable storage medium may be any tangible medium that contains or stores a program, and the program may be used by, or used in combination with, an instruction-executing system, apparatus, or device. In the present disclosure, the computer-readable signal medium may include a data signal propagated in a baseband or as part of a carrier wave, in which computer-readable program code is carried. Such a propagated data signal may adopt a variety of forms, including but not limited to, an electromagnetic signal, an optical signal, or any suitable combination of the foregoing. The computer-readable signal medium may also be any computer-readable medium except the computer-readable storage medium, and the computer-readable signal medium can transmit, propagate, or transfer a program for use by, or use in combination with, an instruction-executing system, apparatus, or device. Program code contained on the computer-readable medium may be transferred using any suitable medium, including but not limited to: wires, optical cables, RF (radio frequency), and the like, or any suitable combination of the foregoing.

The computer-readable medium described above may be contained in the electronic device described above; or may exist alone without being assembled into the electronic device.

The computer-readable medium described above carries one or more programs that, when executed by the electronic device, causes the electronic device to execute the methods illustrated by the embodiments described above.

Computer program code used to execute operations of the present disclosure may be written in one or more programming languages or a combination thereof, and the programming languages include an object oriented programming language such as Java, Smalltalk, C++, and also include a conventional procedural programming language such as the "C" language or a similar programming language. The program code may be executed entirely on a user computer, partly executed on the user computer, executed as an individual software package, partly executed on the user computer while partly executed on a remote computer, or executed entirely on the remote computer or server. In a case involving the remote computer, the remote computer may be connected to the user computer through any kind of networks, including a local area network (abbreviated as LAN) or a wide area network (abbreviated as WAN), or, may be connected to an external computer (e.g. being connected through the Internet by utilizing an Internet service provider).

The flowcharts and block diagrams in the accompanying drawings illustrate architectures, functionalities and operations which may be implemented according to systems, methods and computer program products of various embodiments of the present disclosure. In this regard, each block in the flowcharts or block diagrams may represent a module, a program segment, or a portion of code, which includes one or more executable instructions for implementing a specified logical function. It should also be noted that, in some alternative implementations, the functions noted in the blocks may occur in a different order from the order noted in the accompanying drawings. For example, two blocks represented in succession may, in fact, be executed basically concurrently, or sometimes they may be executed in a reverse order, which depends upon a function involved. It should also be noted that each block of the block diagrams and/or flowcharts, and combinations of blocks in the block diagrams and/or flowcharts, can be implemented using special purpose hardware-based systems that perform the specified functions or operations, or can be implemented using a combination of special purpose hardware and computer instructions.

Units described in and related to the embodiments of the present disclosure may be implemented by means of software, or may be implemented by means of hardware. In some cases a name of a unit does not constitute a definition of the unit itself, for example, a first acquiring unit may also be described as "a unit for acquiring at least two Internet protocol addresses".

The functions described above may be performed at least partly by one or more hardware logic components. For example, without limitation, exemplary types of hardware logic components that can be used include: a field programmable gate arrays (FPGA), an application specific integrated circuit (ASIC), an application-specific standard products (ASSP), a system-on-chip (SoC), a complex programmable logic device (CPLD), and the like.

In context of the present disclosure, a machine-readable medium may be a tangible medium, and may contain or store a program for use by, or used in combination with, an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above-described content. More specific examples of the machine-readable storage medium would include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the above-described content.

In a first aspect, according to one or more embodiments of the present disclosure, a multimedia playing method is provided, including:

displaying a first interface;

playing a segment of a first playing object on the first interface, where the first interface includes prompt information, and the prompt information is used to prompt that the segment of the first playing object is being played.

According to one or more embodiments of the present disclosure, the first interface further includes a first key, and the method further includes:

displaying a second interface in response to a first triggering operation acting on a first key;

playing a second playing object on the second interface, where the second playing object is capable of being completely played.

According to one or more embodiments of the present disclosure, the segment of the first playing object is an essence portion of the first playing object.

According to one or more embodiments of the present disclosure, the essence portion of the first playing object is a refrain portion of the first playing object.

According to one or more embodiments of the present disclosure, the first interface further includes a progress bar corresponding to the first playing object, and a position where the segment is located in the first playing object and a time progress of playing are displayed on the progress bar.

According to one or more embodiments of the present disclosure, the first interface and the second interface are interfaces of different players.

According to one or more embodiments of the present disclosure, the first interface further includes a second key, and the method further includes:

displaying the second key in a first preset style and stopping playing the segment, in response to a second triggering operation acting on the second key.

According to one or more embodiments of the present disclosure, the method further includes:

displaying the first key in a second preset style in response to the second triggering operation acting on the second key.

According to one or more embodiments of the present disclosure, the method further includes:
in response to a third triggering operation acting on the second key displayed in the first preset style, displaying the second key in a third preset style, and continuing to play or re-playing the segment.

According to one or more embodiments of the present disclosure, the method further includes:
displaying the first key in a fourth preset style in response to a third triggering operation on the second key displayed in the first preset style.

According to one or more embodiments of the present disclosure, a third interface is provided by the electronic device, where the third interface includes a first playing object list, and the displaying the first interface includes:
displaying the first interface in response to a fourth triggering operation acting on any first playing object in the first playing object list.

According to one or more embodiments of the present disclosure, the method further includes:
switching the segment of the first playing object currently played on the first interface to a segment of a next first playing object in response to a fifth triggering operation acting on the first interface.

According to one or more embodiments of the present disclosure, the method further includes:
displaying a fourth interface in response to a sixth triggering operation acting on the prompt information, where the fourth interface includes a member introduction area and/or a membership-opening prompt key.

According to one or more embodiments of the present disclosure, the first preset style includes one or more of a shrinking display of the second key, displaying the second key in gray scale, and displaying a preset pause prompt icon on the second key.

According to one or more embodiments of the present disclosure, the second preset style includes one or more of an amplifying display of the first key, highlighting the first key, displaying a preset random playing prompt text on the first key, and displaying a preset random playing prompt icon on the first key.

According to one or more embodiments of the present disclosure, the first interface further includes one or more of a collecting key, a comment key, a sharing key, a like key, and a subtitle display area.

In a second aspect, according to one or more embodiments of the present disclosure, a multimedia playing device is provided, including:
a display module, configured to display a first interface;
a processing module, configured to play a segment of a first playing object on the first interface, where the first interface includes prompt information, and the prompt information is used to prompt that the segment of the first playing object is being played.

According to one or more embodiments of the present disclosure, the first interface further includes a first key, and the processing module is further configured to:
display a second interface in response to a first triggering operation acting on a first key;
play a second playing object on the second interface, where the second playing object is capable of being completely played.

According to one or more embodiments of the present disclosure, the segment of the first playing object is an essence portion of the first playing object.

According to one or more embodiments of the present disclosure, the essence portion of the first playing object is a refrain portion of the first playing object.

According to one or more embodiments of the present disclosure, the first interface further includes a progress bar corresponding to the first playing object, and a position where the segment is located in the first playing object and a time progress of playing are displayed on the progress bar.

In an embodiment of the present disclosure, the first interface and the second interface are interfaces of different players.

According to one or more embodiments of the present disclosure, the first interface further includes a second key, and the processing module is further configured to:
in response to a second triggering operation acting on the second key, display the second key in a first preset style, and stop playing the segment.

According to one or more embodiments of the present disclosure, the processing module is further configured to:
display the first key in a second preset style in response to the second triggering operation acting on the second key.

According to one or more embodiments of the present disclosure, the processing module is further configured to:
in response to a third triggering operation acting on the second key displayed in the first preset style, display the second key in a third preset style, and continue to play or re-play the segment.

According to one or more embodiments of the present disclosure, the processing module is further configured to:
display the first key in a fourth preset style in response to the third triggering operation on the second key displayed in the first preset style.

According to one or more embodiments of the present disclosure, a third interface is provided by an electronic device, where the third interface includes a first playing object list, and the display module is further configured to:
display the first interface in response to a fourth triggering operation acting on any first playing object in the first playing object list.

According to one or more embodiments of the present disclosure, the processing module is further configured to:
switch the segment of the first playing object currently played on the first interface to a segment of a next first playing object in response to a fifth triggering operation acting on the first interface.

According to one or more embodiments of the present disclosure, the processing module is further configured to:
display a fourth interface in response to a sixth triggering operation acting on the prompt information, where the fourth interface includes a member introduction area and/or a membership-opening prompt key.

According to one or more embodiments of the present disclosure, the first preset style includes one or more of a shrinking display of the second key, displaying the second key in gray scale, and displaying a preset pause prompt icon on the second key.

According to one or more embodiments of the present disclosure, the second preset style includes one or more of an amplifying display of the first key, highlighting the first key, displaying a preset random playing prompt text on the first key, and displaying a preset random playing prompt icon on the first key.

According to one or more embodiments of the present disclosure, the first interface further includes one or more of a collecting key, a comment key, a sharing key, a like key, and a subtitle display area.

In a third aspect, according to one or more embodiments of the present disclosure, an electronic device is provided, including: at least one processor and a memory;

the memory has computer-executing instructions stored thereon;

the at least one processor executes the computer-executing instructions stored on the memory, to cause the at least one processor to execute the multimedia playing method as described in the first aspect and various possible designs of the first aspect.

In a fourth aspect, according to one or more embodiments of the present disclosure, a computer-readable storage medium is provided, and the computer-readable storage medium has computer-executing instructions stored therein, and when a processor executes the computer-executing instructions, the multimedia playing method as described in the first aspect and various possible designs of the first aspect is implemented.

The above description is merely relatively preferred embodiments of the present disclosure and an illustration of the employed principles. It should be understood by those skilled in the art that the disclosure scope related in the present disclosure is not limited to a technical solution according to a particular combination of the above-described technical features, and should also cover other technical solutions formed by any combination of the above-described technical features or the equivalent features thereof without departing from the disclosed concepts, such as a technical solution formed by replacing the above-described features and the technical features having functions similar to those disclosed (but not limited thereto) in the present disclosure with each other.

Furthermore, although operations are depicted in a particular sequence, this should not be interpreted as requiring that such operations be performed in the particular sequence shown or in a sequential sequence. In a certain circumstance, multitasking and parallel processing may be advantageous. Likewise, although several specific implementation details are included in the above discussion, these should not be interpreted as limitations to the scope of the present disclosure. Some features described in context of separate embodiments can also be implemented in combination in a single embodiment. Conversely, various features described in context of a single embodiment can also be implemented in multiple embodiments separately or in a manner of any suitable sub-combination.

Although the subject matter has been described in language specific to structural features and/or methodological acts, it should be understood that the subject matter defined in the appended claims is not necessarily limited to the specific features or acts described above. On the contrary, the specific features and acts described above are merely exemplary forms of implementing the claims.

What is claimed is:

1. A multimedia playing method, comprising:
  displaying a first interface; and
  playing a segment of a first playing object on the first interface, wherein the first interface comprises prompt information, and the prompt information is used to prompt that the segment of the first playing object is being played,
  wherein the first interface further comprises a first key, and the method further comprises:
  displaying a second interface in response to a first triggering operation acting on the first key; and
  playing a second playing object on the second interface, wherein the second playing object is capable of being completely played,
  wherein the first interface and the second interface are interfaces of different players.

2. The method according to claim 1, wherein the segment of the first playing object is an essence portion of the first playing object.

3. The method according to claim 2, wherein the essence portion of the first playing object is a refrain portion of the first playing object.

4. The method according to claim 1, wherein the first interface further comprises a progress bar corresponding to the first playing object, and a position where the segment is located in the first playing object and a time progress of playing are displayed on the progress bar.

5. The method according to claim 1, wherein the first interface further comprises a second key, and the method further comprises:
  in response to a second triggering operation acting on the second key, displaying the second key in a first preset style, and stopping playing the segment.

6. The method according to claim 5, further comprising:
  displaying the first key in a second preset style in response to the second triggering operation acting on the second key.

7. The method according to claim 6, wherein the second preset style comprises one or more of an amplifying display of the first key, highlighting the first key, displaying a preset random playing prompt text on the first key, and displaying a preset random playing prompt icon on the first key.

8. The method according to claim 5, further comprising:
  in response to a third triggering operation acting on the second key displayed in the first preset style, displaying the second key in a third preset style, and continuing to play or re-playing the segment.

9. The method according to claim 5, further comprising:
  displaying the first key in a fourth preset style in response to a third triggering operation acting on the second key displayed in the first preset style.

10. The method according to claim 5, wherein the first preset style comprises one or more of a shrinking display of the second key, displaying the second key in gray scale, and displaying a preset pause prompt icon on the second key.

11. The method according to claim 1, wherein a third interface is provided by an electronic device, wherein the third interface comprises a first playing object list, and the displaying the first interface comprises:
  displaying the first interface in response to a fourth triggering operation acting on any first playing object in the first playing object list.

12. The method according to claim 1, further comprising:
  switching the segment of the first playing object currently played on the first interface to a segment of a next first playing object in response to a fifth triggering operation acting on the first interface.

13. The method according to claim 1, further comprising:
  displaying a fourth interface in response to a sixth triggering operation acting on the prompt information, wherein the fourth interface comprises a member introduction area and/or a membership-opening prompt key.

14. The method according to claim 1, wherein the first interface further comprises one or more of a collecting key, a comment key, a sharing key, a like key, and a subtitle display area.

15. An electronic device, comprising:

a processor and a memory;

the memory has computer-executing instructions stored thereon; and the processor executes the computer-executing instructions stored on the memory, to cause the processor to:

display a first interface; and play a segment of a first playing object on the first interface, wherein the first interface comprises prompt information, and the prompt information is used to prompt that the segment of the first playing object is being played, wherein the first interface further comprises a first key, and the processor is further caused to:

display a second interface in response to a first triggering operation acting on the first key; and play a second playing object on the second interface, wherein the second playing object is capable of being completely played, wherein the first interface and the second interface are interfaces of different players.

16. The electronic device according to claim 15, wherein the segment of the first playing object is an essence portion of the first playing object.

17. A computer-readable storage medium, having computer-executing instructions stored therein, wherein a processor executes the computer-executing instructions to:

display a first interface; and play a segment of a first playing object on the first interface, wherein the first interface comprises prompt information, and the prompt information is used to prompt that the segment of the first playing object is being played, wherein the processor further executes the computer-executing instructions to:

display a second interface in response to a first triggering operation acting on the first key; and play a second playing object on the second interface, wherein the second playing object is capable of being completely played, wherein the first interface and the second interface are interfaces of different players.

* * * * *